United States Patent
Kuchi

(10) Patent No.: US 10,855,503 B2
(45) Date of Patent: Dec. 1, 2020

(54) SYSTEM AND METHOD FOR GENERATING SPREADED SEQUENCE WITH LOW PEAK-TO-AVERAGE POWER RATIO (PAPR) WAVEFORM

(71) Applicant: WISIG NETWORKS PRIVATE LIMITED, Telangana (IN)

(72) Inventor: Kiran Kumar Kuchi, Hyderabad (IN)

(73) Assignee: WISIG NETWORKS PRIVATE LIMITED

( * ) Notice: Subject to any disclaimer, the term of this patent is extended or adjusted under 35 U.S.C. 154(b) by 0 days.

(21) Appl. No.: 16/479,447

(22) PCT Filed: Dec. 12, 2017

(86) PCT No.: PCT/IN2017/050589
§ 371 (c)(1),
(2) Date: Jul. 19, 2019

(87) PCT Pub. No.: WO2018/134838
PCT Pub. Date: Jul. 26, 2018

(65) Prior Publication Data
US 2019/0379567 A1     Dec. 12, 2019

(30) Foreign Application Priority Data

Jan. 20, 2017 (IN) .............................. 201741002328
Aug. 11, 2017 (IN) .............................. 201741028728
(Continued)

(51) Int. Cl.
*H04L 27/26* (2006.01)
*H04B 1/7103* (2011.01)
(Continued)

(52) U.S. Cl.
CPC ....... *H04L 27/2615* (2013.01); *H04B 1/7103* (2013.01); *H04L 5/0016* (2013.01);
(Continued)

(58) Field of Classification Search
CPC .................... H04B 1/7103; H04B 1/69; H04B 2201/70706; H04L 25/03057;
(Continued)

(56) References Cited

U.S. PATENT DOCUMENTS 5,157,688 A * 10/1992 Dell-Imagine ......... H04B 1/707
                                                                                    375/130
2001/0001616 A1* 5/2001 Rakib ...................... H04N 7/10
                                                                                     375/259
(Continued)

FOREIGN PATENT DOCUMENTS

WO      2016/117973 A1     7/2016

OTHER PUBLICATIONS

International Search Report, dated Feb. 21, 2018, in International Application No. PCT/IN2017/050589.

*Primary Examiner* — Syed Haider
(74) *Attorney, Agent, or Firm* — McAndrews, Held & Malloy, Ltd.

(57) ABSTRACT

Embodiments of the present disclosure relate to a method and system to generate a waveform in a communication network. The transmitter receives an input data and transmit a generated waveform to another communication system. The input data is spread with a spread code to generate a spread data and rotated using a constellation rotation operation to produce a rotated data. The rotated data is then precoded using precoding filter to produce a precoded data, and transformed into DFT output data using DFT operation. The DFT output data is then mapped with subcarriers to generate the sub-carrier mapped DFT data and modulated
(Continued)

using Orthogonal Frequency Division Multiplexing (OFDM) modulation to generate the waveform with low PAPR.

21 Claims, 8 Drawing Sheets

(30) Foreign Application Priority Data

Sep. 12, 2017 (IN) .............................. 201741032140
Oct. 2, 2017 (IN) .............................. 201741034853

(51) Int. Cl.
*H04L 5/00* (2006.01)
*H04L 25/03* (2006.01)

(52) U.S. Cl.
CPC .... *H04L 25/03057* (2013.01); *H04L 27/2634* (2013.01); *H04B 2201/70706* (2013.01)

(58) Field of Classification Search
CPC . H04L 5/0007; H04L 5/0016; H04L 27/2634; H04L 27/2615; H04J 13/0062
See application file for complete search history.

(56) References Cited

U.S. PATENT DOCUMENTS

| | | | |
|---|---|---|---|
| 2006/0199557 A1* | 9/2006 | Kimata | H04B 7/0684 455/213 |
| 2010/0074244 A1* | 3/2010 | Luo | H04L 5/0048 370/343 |
| 2011/0158219 A1* | 6/2011 | Ko | H04L 25/03343 370/344 |
| 2012/0176981 A1* | 7/2012 | Baldemair | H04L 25/0226 370/329 |
| 2012/0213111 A1* | 8/2012 | Shimezawa | H04L 1/06 370/252 |
| 2012/0250652 A1* | 10/2012 | Nakao | H04B 1/7103 370/329 |
| 2013/0155974 A1* | 6/2013 | Papasakellariou | H04L 1/0029 370/329 |
| 2014/0003544 A1* | 1/2014 | Oketani | H04L 5/0007 375/259 |
| 2014/0254530 A1* | 9/2014 | Kim | H04L 5/005 370/329 |
| 2015/0289275 A1* | 10/2015 | Nakamura | H04W 72/0466 370/335 |
| 2015/0289280 A1* | 10/2015 | Davydov | H04B 1/3827 370/252 |
| 2017/0134203 A1* | 5/2017 | Zhu | H04L 27/2614 |

* cited by examiner

SYSTEM AND METHOD FOR GENERATING SPREADED SEQUENCE WITH LOW PEAK-TO-AVERAGE POWER RATIO (PAPR) WAVEFORM

TECHNICAL FIELD

Embodiments of the present disclosure are related, in general to communication, but exclusively relate to method and system for generating and transmitting a waveform having low peak-to-average power ratio (PAPR) data or control communication using a spread sequence. Embodiments disclose spreading sequences that have low PAPR and low cross-correlation.

BACKGROUND

Presently, 5G new radio (NR) supports enhanced mobile broadband (eMBB), ultra-reliable-low-latency-communication (URLLC) and massive-machine-type-communication (mMTC) for frequency bands below 6 GHz, as well as above 6 GHz, including millimeter wave bands i.e. 20-40 GHz and 20-30 GHz.

For ultra-low latency, a communication system requires uplink control information such as hybrid automatic repeat request (ARQ) ACK/NACK, for at least one of successful decoding of block through 1-bit ACK/NACK commands, and uplink sounding reference signal (SRS) to be sent to the base station with very low delay. Other control information comprises channel quality indicator (CQI), MIMO rank and other information.

As per the specifications, 5G requires a method of multiplexing control, data, and SRS signals using certain waveform. The 5G NR supports both Discrete Fourier Transform-spread-Orthogonal frequency-division multiplexing (DFT-s-OFDM) based waveform and Orthogonal frequency-division multiplexing (OFDM) waveform for uplink. In the uplink transmission, multiple users can simultaneously transmit control information in the same time frequency resources. The users may be multiplexed in time, frequency or code domain. The user control information (UCI) may be 1 or 2 bits for the case of HARQ ACK/NACK, Scheduling Request (SR) etc., or more than 2 bits for the case of CQI, MIMO rank or other information. Generally, the control channel that carries 1 or 2 bits UCI is called short Physical Uplink Control Channel (PUCCH) and the one that carries more than 2 bits UCI is called long PUCCH. Similarly, the reference signals (RS) which are used for channel estimation may be multiplexed in time, frequency or code domain. Existing methods do not facilitate generation of a waveform that can transmit the signal at or near PA saturation power level. Therefore, there exists a need for a method of transmitting UCI up to 2 bits or more than two bits using a waveform with low PAPR so that the power amplifier (PA) can transmit at maximum available power and that the waveform preferably support transmission of multiple users in the same time frequency resources.

SUMMARY

The shortcomings of the prior art are overcome and additional advantages are provided through the provision of method of the present disclosure.

Additional features and advantages are realized through the techniques of the present disclosure. Other embodiments and aspects of the disclosure are described in detail herein and are considered a part of the claimed disclosure.

Accordingly, the present disclosure relates to a method of generating a waveform in a communication network. The method comprises performing spreading operation on an input data with a spread code to generate a spread data. The spread data is then rotated to generate a rotated data which is then precoded using a precoding filter to produce a precoded data. The method further comprising transforming of precoded data into DFT output data using DFT operation and mapped with sub-carriers to generate a sub-carrier mapped DFT data. Upon mapping operation, the sub-carrier mapped DFT transformed data is the modulated using Orthogonal Frequency Division Multiplexing (OFDM) to generate the waveform.

Further, the present disclosure relates to a system for generating a waveform in a communication network. The system comprises a processor, and a memory communicatively coupled to the processor. The processor is configured to spread input data with a spread code to generate a spread data and perform a constellation rotation operation on the spread data to produce a rotated data. The processor is further configured to precode the rotated data using a precoding filter to produce a precoded data and perform Discrete Fourier Transform (DFT) on the precoded data to generate DFT output data. Furthermore, the processor maps the DFT output data with one of contiguous and distributed subcarriers to generate the sub-carrier mapped DFT data. Upon mapping of the DFT output data, the processor generates a waveform based on Orthogonal Frequency Division Multiplexing (OFDM) modulation of the sub-carrier mapped DFT data.

In another embodiment, the present disclosure relates to a method for detecting a waveform in a communication network. The method comprising transforming an input data using Discrete Fourier Transform (DFT) operation to obtain transformed data. The method further comprising de-mapping the transformed data using sub carriers to generate a de-mapped transformed output data. Upon de-mapping operation, the method further comprises step of filtering the de-mapped transformed output data using estimated channel information to generate OFDM symbol level output. The OFDM symbol data is generated by processing the OFDM symbol level output to remove a cover code and generate OFDM symbol data. Furthermore, the method comprising estimating at least data and control information by demodulating the processed OFDM symbol data.

Further, the present disclosure relates to a system for detecting a waveform in a communication network. The system comprises a processor and a memory communicatively coupled with the processor. The processor is configured to transform input data using Discrete Fourier Transform (DFT) operation to obtain transformed data. The processor is further configured to de-map the transformed data using sub carriers to generate a de-mapped transformed output data and filter the de-mapped transformed output data using estimated channel information to generate OFDM symbol level output. The processor processes the OFDM symbol level output to remove a cover code and generates OFDM symbol data. Further, the processor estimates at least data and control information by demodulating the processed OFDM symbol data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which:

DETAILED DESCRIPTION

Figure 1:
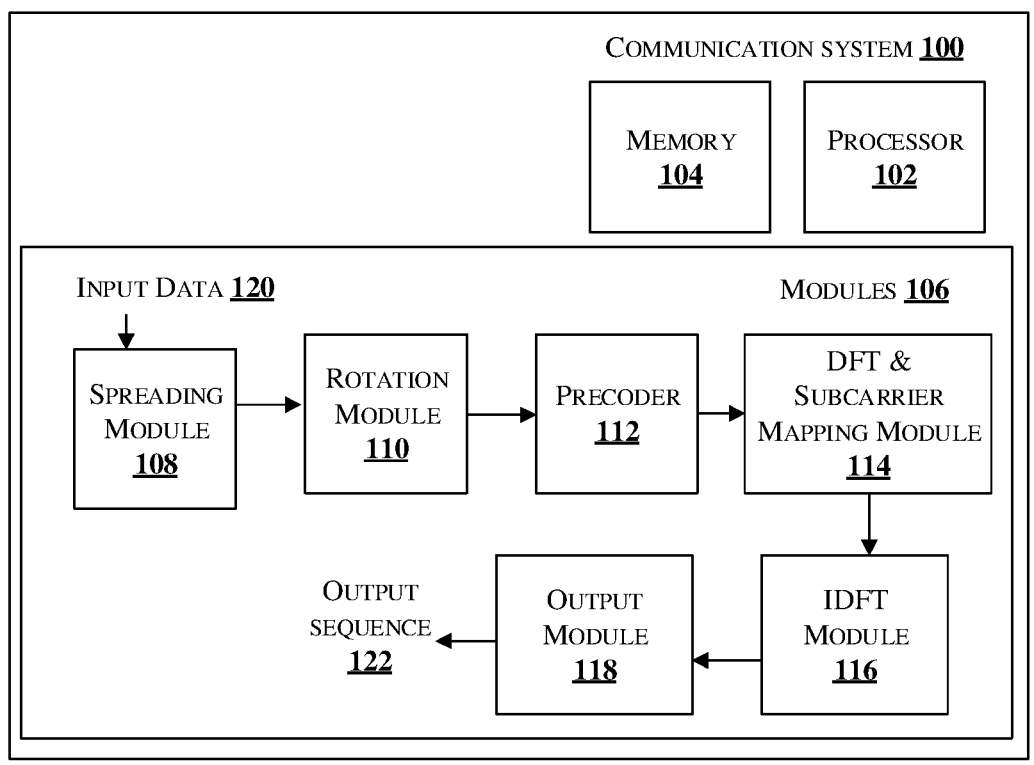
FIG. 1 shows a block diagram of a communication system for transmitting a pi/2 Binary Phase Shift Keying (BPSK) spreaded and filtered sequence based waveform, in accordance with an embodiment of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

Embodiments of the present disclosure relate to a method and system to generate a waveform in a communication network. The transmitter receives an input data and transmit a generated waveform to another communication system. The method receives the input data and spread input data with a spread code to generate a spread data and perform a constellation rotation operation on the multiplied data to produce a rotated data. The method further comprises precoding the rotated data using precoding filter to produce a precoded data, and mapping the DFT output data with one of contiguous and distributed subcarriers to generate the sub-carrier mapped DFT data. Based on Orthogonal Frequency Division Multiplexing (OFDM) modulation of the sub-carrier mapped DFT data, the waveform is generated.

FIG. 1 shows a block diagram of a communication system for transmitting a pi/2 Binary Phase Shift Keying (BPSK) spreaded and filtered sequence based waveform, in accordance with an embodiment of the present disclosure.

As shown in FIG. 1, the communication system 100 comprises a processor 102, and memory 104 coupled with the processor 102. The communication system 100 may also be referred as a transmitter. The processor 102 may be configured to perform one or more functions of the communication system 100 for receiving input data and generate waveform for transmitting to a receiver. In one implementation, the communication system 100 may comprise modules 106 for performing various operations in accordance with the embodiments of the present disclosure. The communication system 100 may be used for transmission of 1-bit or 2-bit user control information (UCI) using coherent communication or for transmission of more than 2 bits UCI or data. Coherent communication refers to a system that uses a reference signal (RS) for channel estimation and demodulates the UCI or data using an estimated channel.

The modules 106 includes a spreading module 108, rotation module 110, a precoder 112, a discrete Fourier transform (DFT) and subcarrier mapping module 114, an inverse fast Fourier transform (IFFT) module 116 and an output module 118. The discrete Fourier transform (DFT) and subcarrier mapping module 114 is hereinafter referred as a DFT module 114. The inverse DFT module 116 is also referred as an inverse Fast Fourier transform (IFFT) module.

The spreading module 108 receives an input data 118 which may be BPSK symbols that are spread using a spreading code to generate spread data. For example, the input data 118 may be a BPSK sequence. In another example, the input BPSK sequence may be of length Q=1 for 1-bit feedback. The technique of spreading may be generalized to transmission of one or more than 1 bit where each bit is mapped to a BPSK symbol and is spread using a spreading code, in one embodiment. In another embodiment, the spreading module 108 may receive input as two bits, which may be communicated using a QPSK constellation point and further spread using a BPSK spreading code.

In one embodiment, the rotation module 110 receives the spread data and performs a constellation rotation operation on the received spread data. The rotation module 108 performs $j^k$ rotation on the spread data 118 i.e., on the BPSK spread sequence to generate a rotated sequence. The rotated sequence is fed to the precoder 112 for pre-coding the rotated inputs sequence. In another embodiment, the rotation module 110 receives the input data 118 and performs the constellation rotation operation on the received input data 118. The spreading module 108 then receives the rotated data and performs spreading operation using a spread code to generate the spread data. The spread data is then fed to the precoder 112 for pre-coding.

The precoder 112 may be one of 1+D and 1−D precoder as illustrated below in equations (1) and (2):

$$H(D) = 1+D \quad (1)$$

$$H(D) = 1-D \quad (2)$$

Wherein D is a delay element. In an embodiment the precoder may be a 3-tap filter of type: $H(D) = 0.26\ D^{-1} + 0.92 + 0.26\ D$ or $H(D) = -0.26\ D^{-1} + 0.92 - 0.26\ D$ In an embodiment, considering time domain, the precoder 112 represents a circular convolution of input with a two-tap filter, where the two taps have equal values. The precoder 112 reduces PAPR of the output waveform significantly. The precoder 112 output is a pre-coded data, which is fed to the DFT module 114.

The DFT module 114 performs a DFT spreading and subcarrier mapping on the precoded data, and the output of the DFT module 114 is mapped with contiguous or distributed subcarriers for generating the transformed sequence. The DFT module 114 performs an M-point DFT operation on a sequence $\chi_n$ that may be defined as illustrated below in equation (3):

$$X_k = \sum_{l=0}^{M-1} x_n e^{\frac{-i2\pi kl}{M}}, k = 0, 1, 2, \ldots M-1 \ i = \sqrt{-1} \quad (3)$$

In an embodiment, considering the precoder 112 is a 1+D precoder $0.26\ D^{-1} + 0.92 + 0.26\ D$, then the DFT module 114 performs a subcarrier mapping such that the DFT is taken over the range $0, \ldots, M-1$, then the left half of DFT output will be swapped with right half. In another embodiment, if the precoder 112 is a 1−D precoder or $)=-0.26\ D^{-1}+0.92-0.26\ D$ and if the DFT is taken over the range $0, \ldots, M-1$, then the output of the DFT module 114 output will be directly mapped to one of contiguous and distributed subcarriers.

In another embodiment, the precoder 112 may be a filter with real or complex-values whose length is less than or equal to the DFT size. In yet another embodiment, the precoder 112 may be alternatively implemented in frequency domain after the DFT as a subcarrier level filter. The subcarrier filter may be computed as the M-point DFT of the time domain precoder.

In another embodiment, the DFT module 114 performs DFT spreading and sub-carrier mapping operation on the input data which is not pre-coded. The input data may be one of a rotated data and spread data. The DFT module 114 performs DFT operation on the input data and the output data is then pre-coded using the precoder 112.

The IDFT module 116 is configured to perform an inverse transform of the transformed sequence, to generate a time domain signal. After the IDFT or IFFT operation, the output module 118 performs at least one of addition of cyclic prefix, cyclic suffix, windowing, windowing with overlap and adding operation (WOLA) on the time domain signal to generate output sequence 122. A half subcarrier frequency shift may be applied to avoid DC transmission. In an embodiment, the output sequence 122 may be fed to the digital to analog converter to generate an analog waveform. The output sequence 122 is at least one of 1-bit control data and 2-bit control data for short duration physical uplink control channel (PUCCH), in an embodiment. In one embodiment of 1 or 2 bit UCI, the waveform may be realized by pre-computing the values at the output of DFT for a given spreading sequence with a reference positive BPSK input so that the entire waveform may be specified as a sequence. This sequence may be multiplied with a BPSK or QPSK UCI symbol before applying subcarrier mapping and IDFT. This method results in a set of frequency domain sequences that are only a function of BPSK spreading sequences. In a preferred embodiment the precoder takes 2 or 3-taps in time domain. In another embodiment, the output sequence 122 is a long PUCCH that transmit UCI or data of length more than 2 bits.

In an embodiment, the precoder 112 is not defined by standard, but implementation specific. For such precoder 112, since RS and control/data use the same precoder, the channel estimates implicitly estimate the precoder value. In such cases, it is sufficient to specify the BPSK spreading sequences only. In an embodiment, the communication system 100 is configured to optionally multiply the subcarrier mapped DFT data with an element of Orthogonal Cover Code (OCC), when the rotation on the input data is performed directly without spreading. Also, an inverse Discrete Fourier Transform (IDFT) on the subcarrier mapped DFT output with OCC can be performed to generate IDFT output. Thereafter, the output module 118 generates a waveform by performing Orthogonal Frequency Division Multiplexing (OFDM) modulation.

Figure 2A:
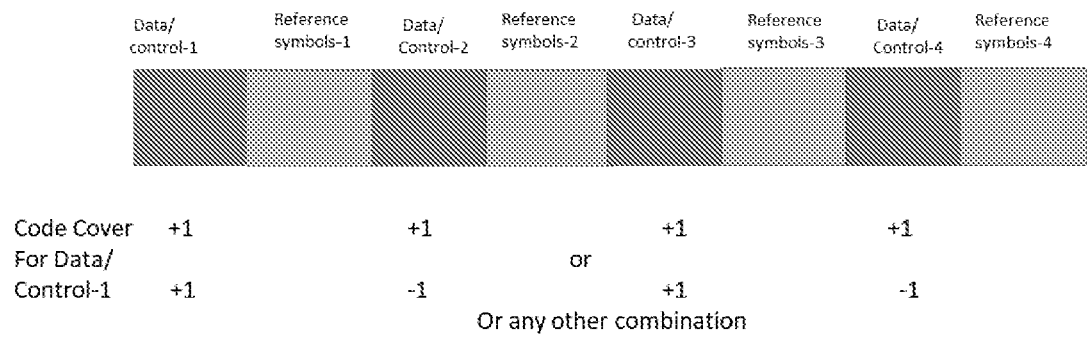
FIGS. 2A and 2B depicts illustration of a representation of input data with reference symbols in a communication system, in accordance with an embodiment of the present disclosure.
Figure 2B:
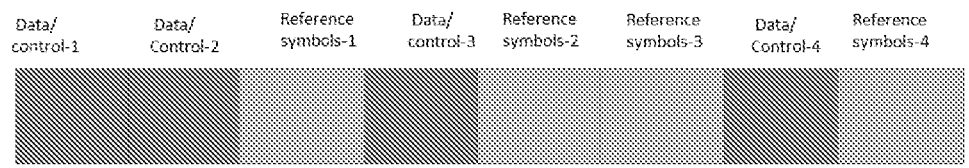

FIGS. 2A and 2B depicts illustration of a representation of input data with reference symbols in a communication system, in accordance with another embodiment of the present disclosure.

As shown in FIGS. 2A and 2B, the input data may be a 1 or 2-bit data/control information may be repeated over multiple OFDM symbols using a code cover. The sequence may have one subframe with control reference symbol (RS)

multiplexing in accordance with an embodiment of the present disclosure. The RS may be multiplexed with control using alternating patterns with different RS density. As shown in FIG. 2A, the input data is combination of sequence of data/control information and RS, repeated alternatively. FIG. 2B shows another embodiment of input data sequence, which is a combination of sequence of data/control information and RS in any combination.

Figure 2C:
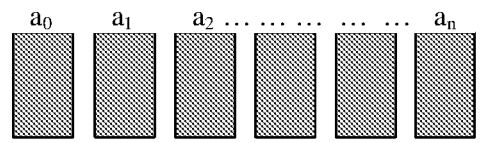
FIG. 2C shows an illustration of an input data.
Figure 2D:
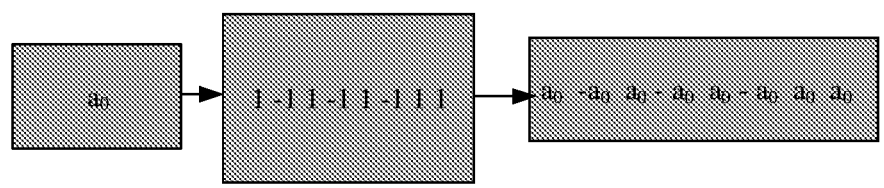
FIG. 2D shows an illustration of spread code sequence is applied on each symbol, in accordance with some embodiments of the present disclosure.

FIG. 2C shows an illustration of an input data. In one embodiment, the input data is a plurality of real or complex-valued symbols. FIG. 2D shows an illustration of spread code sequence is applied on each symbol. The spread sequence may be selected as one of BPSK, Gold sequences, m-sequences etc. The RS may use ZC sequences or BPSK sequences where BPSK sequences or spreading codes may be obtained from Gold sequences, m-sequences or computer-generated sequences that minimize PAPR.

In another embodiment, data of multiple users is multiplexed using at least one of time, frequency and code domain using DFT-S-OFDM that uses pi/2 BPSK modulation with spectrum shaping or higher order modulation. In this embodiment, RS is time multiplexed with data or RS may occupy different OFDM symbols other than data. The RS of multiple users may be multiplexed in at least one of time, code, and frequency dimensions.

Figure 2E:
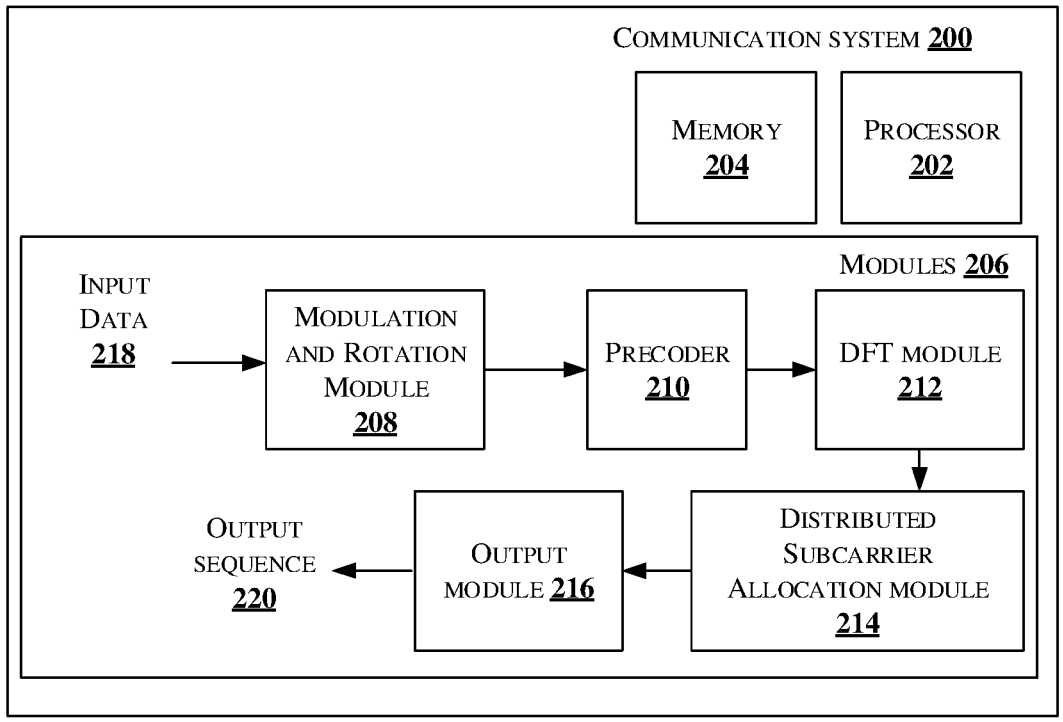
FIG. 2E shows a block diagram of a communication system for generating and transmitting a waveform from a user data which is multiplexed in frequency domain, in accordance with an embodiment of the present disclosure.

FIG. 2E shows a block diagram of a communication system for generating and transmitting a waveform from a user data which is multiplexed in frequency domain with reference signal or other user data, in accordance with an alternative embodiment of the present disclosure.

As shown in FIG. 2E, the communication system 200 includes the processor 202, and the memory 204. The memory 204 may be communicatively coupled to the processor 202. The processor 202 may be configured to perform one or more functions of the communication system 200 for receiving data. In one implementation, the communication system 200 may comprise modules 206 for performing various operations in accordance with the embodiments of the present disclosure. The communication system 200 is configured to multiplex user data in frequency domain. The data may be control information. The communication system 200 includes at least one transceiver (not shown in Fig) to perform receiving an input data from a transmitter, and transmitting a generated waveform to a destination.

The modules 206 includes a modulation and rotation module 208, a precoder 210, a discrete Fourier transform (DFT) module 212, a distributed subcarrier allocation module 214 and an output module 216. The discrete Fourier transform (DFT) 212 is also referred as DFT module.

The modulation and rotation module 208 is configured to perform modulation and rotation on the input data 218 to generate rotated data. In one embodiment, the input data 218 may be channel coded data or control information bits. In another embodiment, the input data 218 is user data. The rotation performed by the modulation and rotation module 208 is constellation rotation. The modulation may be one of BPSK, QPSK and any other modulation. For BPSK modulation on the control bits 218, the constellation rotation factor is pi/2 i.e. 90-deg shift between successive BPSK symbols. For QPSK modulation on the control bits 218, the constellation rotation may be zero of pi/4. A spectrum shaping function may be applied.

The precoder 210 is configured to receive rotated data and generate precoded data, also referred as filtered data. The precoder may be one of 1+D and 1−D precoder as illustrated below in equations (1) and (2):

$$H(D)=1+D \quad (1)$$

$$H(D)=1-D \quad (2)$$

Wherein D is a delay element. In an embodiment the precoder may be a 3-tap filter of type: $H(D)=0.26\ D^{-1}+0.92+0.26\ D$ or $H(D)=-0.26\ D^{-1}+0.92-0.26\ D$. The precoder 210 reduces PAPR of the waveform significantly.

The DFT module 212 performs a DFT spreading and subcarrier mapping on the precoded data, and the output of the DFT module 212 is mapped with contiguous or distributed subcarriers for generating the transformed sequence. The spectrum shaping may be implemented as a circular convolution in time domain or after DFT module 212 in frequency domain as a multiplication filter at subcarrier level. The frequency domain subcarriers are one of localized and distributed.

The distributed subcarrier allocation module 214 is configured to receive the precoded data and perform allocation of distributed subcarriers which are evenly spaced with in the allocated resource block of a length M. For example, if U users are frequency multiplexed then there are U−1 null tones between successive data subcarriers. In this example, U users may be frequency multiplexed where each user has a different starting position in subcarrier mapping. In an embodiment, the user data may comprise of data or control information or reference signal sequence.

The output module 216 is configured to perform inverse DFT or IFFT, followed by at least one of CP addition and at least one of windowing, WOLA and filtering operations to generate an output sequence 220. The input control bits 218 may include RS which may occupy different OFDM symbols than data.

In an alternative embodiment, the multiple users may be multiplexed in time domain in different OFDM symbols, or a combination of time domain, frequency domain and code domain multiplexing to generate the output sequence 220.

Figure 2F:
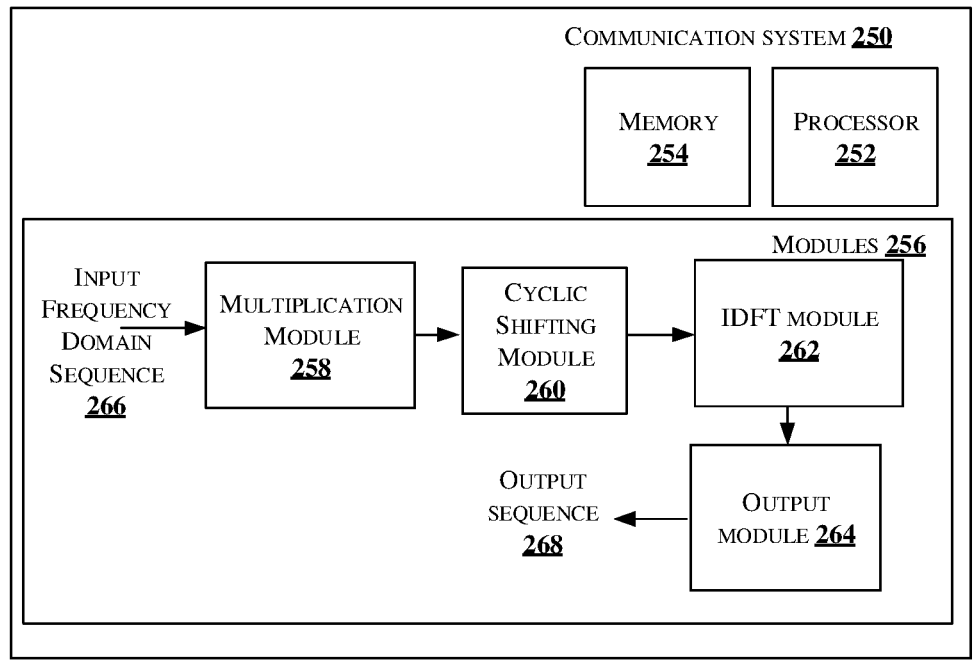
FIG. 2F shows a block diagram of a communication system for generating and transmitting a waveform from a user data which is multiplexed in frequency domain, in accordance with an alternative embodiment of the present disclosure.

FIG. 2F shows a block diagram of a communication system for generating and transmitting a waveform from a user data which is generated directly in frequency domain, in accordance with an alternative embodiment of the present disclosure. This type of implementation is suitable for the case when 1 or 2 bit UCI is mapped to BPSK or QPSK constellation point and the constellation point is spread using a sequence that is input to the IDFY directly thus omitting the intermediate steps of constellation rotation, precoding and DFT operation resulting in a low-complexity implementation that requires specification or storage of possible frequency domain spreading sequences.

As shown in FIG. 2F, the communication system 250 includes the processor 252, and the memory 254. The memory 254 may be communicatively coupled to the processor 252. The processor 252 may be configured to perform one or more functions of the communication system 250 for receiving data. In one implementation, the communication system 250 may comprise modules 256 for performing various operations in accordance with the embodiments of the present disclosure. The communication system 250 is configured to send user data in frequency domain. The data may be control information. The communication system 250 includes at least one transceiver (not shown in Fig) to perform receiving an input data from a transmitter, and transmitting a generated waveform to a destination.

The modules 256 includes a multiplication module 258, a cyclic shifting module 260, an inverse discrete Fourier transform (IDFT) module 262 and an output module 264. The frequency domain module 258 receives an input frequency domain sequence 266 which may be obtained using a base sequence that is obtained by taking a BPSK sequence that goes through pi/2 constellation rotation, precoding and DFT operations. Various cyclic shifts of the base sequence may be used as inputs. The base sequences and the number of cyclic shifts that result in low PAPR and low correlation among the base sequences and zero correlation among the cyclic shifts of a base sequence may be obtained through a computer search. The multiplication module 258 multiplies the input frequency domain sequence 266 with a control information carrying modulation alphabet. The modulation alphabet can be a real or complex value.

The cyclic shifting module 260 apply cyclic shifts by multiplying the elements of the frequency domain sequence 266 with a complex exponential value that introduces required cyclic shift in frequency domain such that the cyclic shifted base sequences are orthogonal to each other. In one example, the number of cyclic shift may be up to 6 i.e., value in the range 0, 1, 2, 3, 4, 5. The time domain cyclic shift is a right or left circular shift of the base sequence. The base sequences are optimized such that the generated waveforms have optimized or low PARP. The time domain computer generated BPSK base sequences are illustrated in the below Table 1 The corresponding frequency domain base sequences are tabulated in Table 4.

TABLE 1

| S. No. | Sequence | | | | | | | | | | | |
|---|---|---|---|---|---|---|---|---|---|---|---|---|
| 1  |  1 | -1 | -1 | -1 | -1 |  1 | -1 |  1 | -1 | -1 |  1 |  1 |
| 2  | -1 | -1 | -1 | -1 | -1 |  1 |  1 | -1 | -1 |  1 | -1 |  1 |
| 3  | -1 | -1 | -1 | -1 |  1 | -1 | -1 |  1 |  1 |  1 | -1 |  1 |
| 4  |  1 | -1 | -1 | -1 |  1 | -1 |  1 |  1 |  1 | -1 | -1 |  1 |
| 5  | -1 | -1 | -1 | -1 |  1 |  1 | -1 |  1 | -1 | -1 | -1 |  1 |
| 6  |  1 | -1 | -1 |  1 | -1 | -1 | -1 |  1 | -1 |  1 |  1 | -1 |
| 7  |  1 | -1 | -1 |  1 |  1 | -1 |  1 |  1 |  1 |  1 | -1 |  1 |
| 8  |  1 |  1 | -1 | -1 | -1 |  1 | -1 | -1 | -1 | -1 |  1 |  1 |
| 9  | -1 |  1 | -1 |  1 |  1 | -1 | -1 | -1 | -1 |  1 | -1 | -1 |
| 10 | -1 |  1 |  1 | -1 |  1 | -1 |  1 |  1 |  1 |  1 |  1 | -1 |
| 11 | -1 |  1 |  1 |  1 | -1 |  1 | -1 | -1 | -1 | -1 |  1 | -1 |
| 12 |  1 | -1 |  1 |  1 | -1 | -1 |  1 |  1 |  1 |  1 |  1 | -1 |
| 13 | -1 | -1 | -1 | -1 |  1 | -1 | -1 | -1 |  1 | -1 |  1 |  1 |
| 14 |  1 | -1 | -1 |  1 |  1 |  1 | -1 |  1 | -1 |  1 |  1 | -1 |
| 15 |  1 | -1 | -1 |  1 | -1 | -1 | -1 | -1 |  1 |  1 | -1 |  1 |
| 16 | -1 | -1 | -1 |  1 | -1 | -1 |  1 |  1 |  1 | -1 |  1 | -1 |
| 17 |  1 | -1 | -1 |  1 | -1 |  1 |  1 |  1 |  1 | -1 |  1 |  1 |
| 18 | -1 | -1 |  1 | -1 | -1 | -1 |  1 | -1 |  1 |  1 |  1 |  1 |
| 19 | -1 | -1 |  1 | -1 |  1 |  1 | -1 | -1 | -1 | -1 |  1 | -1 |
| 20 | -1 | -1 |  1 |  1 | -1 |  1 | -1 | -1 |  1 | -1 | -1 | -1 |
| 21 |  1 |  1 | -1 | -1 |  1 |  1 | -1 | -1 | -1 | -1 | -1 |  1 |
| 22 |  1 | -1 |  1 | -1 | -1 | -1 |  1 |  1 | -1 |  1 |  1 |  1 |
| 23 |  1 |  1 | -1 |  1 | -1 |  1 |  1 |  1 |  1 | -1 | -1 | -1 |
| 24 |  1 |  1 |  1 |  1 |  1 | -1 |  1 | -1 |  1 |  1 | -1 |  1 |
| 25 |  1 | -1 | -1 | -1 |  1 | -1 |  1 | -1 | -1 |  1 |  1 | -1 |
| 26 | -1 | -1 | -1 |  1 | -1 |  1 |  1 | -1 | -1 | -1 | -1 |  1 |
| 27 |  1 | -1 | -1 |  1 | -1 |  1 |  1 |  1 | -1 |  1 |  1 | -1 |
| 28 |  1 | -1 | -1 |  1 |  1 | -1 | -1 |  1 | -1 |  1 | -1 | -1 |
| 29 |  1 | -1 | -1 |  1 |  1 | -1 |  1 | -1 | -1 | -1 |  1 | -1 |
| 30 |  1 | -1 |  1 | -1 | -1 |  1 |  1 |  1 | -1 |  1 | -1 | -1 |

Below Table 4 shows 30 sequences in frequency domain, which may be directly used by the BPSK or QPSK sequences.

TABLE 4

| S. No | DFT output |
|---|---|
| 1 | 0.0000 + 0.0000i 1.4142 + 0.3789i 1.4142 − 1.4142i −2.8284 − 2.8284i −2.4495 + 2.4495i 1.4142 + 5.2779i −2.8284 + 2.8284i −5.2779 + 1.4142i 2.4495 − 2.4495i −2.8284 + 2.8284i 1.4142 − 1.4142i −0.3789 + 1.4142i |
| 2 | 0.0000 + 0.0000i 1.4142 + 0.3789i 0.5176 − 1.9319i −2.8284 − 2.8284i −3.3461 + 0.8966i 1.4142 + 5.2779i −2.8284 − 2.8284i 3.8637 + 3.8637i −0.8966 + 3.3461i −2.8284 + 2.8284i −1.9319 + 0.5176i −1.0353 − 1.0353i |
| 3 | 0.0000 + 0.0000i −0.1895 − 0.7071i 1.7424 − 2.6390i −1.4142 − 1.4142i −4.5708 + 3.0179i −2.6390 − 0.7071i 5.6569 + 2.8284i −2.6390 + 0.7071i 0.3282 + 5.4674i −1.4142 + 1.4142i −3.1566 − 0.1895i −0.1895 + 0.7071i |
| 4 | 0.0000 + 0.0000i 0.1895 + 0.7071i −0.1895 − 3.1566i −1.4142 − 1.4142i −5.4674 − 0.3282i 2.6390 + 0.7071i 2.8284 + 5.6569i −2.6390 + 0.7071i −3.0179 + 4.5708i 1.4142 − 1.4142i −2.6390 + 1.7424i −0.1895 + 0.7071i |
| 5 | 0.0000 + 0.0000i 1.4142 + 0.3789i −1.4142 − 1.4142i −2.8284 − 2.8284i −2.4495 − 2.4495i 1.4142 + 5.2779i 2.8284 + 2.8284i −5.2779 + 1.4142i 2.4495 + 2.4495i −2.8284 + 2.8284i −1.4142 − 1.4142i −0.3789 + 1.4142i |
| 6 | 0.0000 + 0.0000i −0.3789 − 1.4142i 1.4142 − 1.4142i −2.8284 − 2.8284i −2.4495 + 2.4495i −5.2779 − 1.4142i −2.8284 + 2.8284i 1.4142 − 5.2779i 2.4495 − 2.4495i −2.8284 + 2.8284i 1.4142 − 1.4142i 1.4142 − 0.3789i |
| 7 | 0.0000 + 0.0000i −0.1895 − 0.7071i −0.1895 − 3.1566i 1.4142 + 1.4142i −5.4674 − 0.3282i −2.6390 − 0.7071i 2.8284 + 5.6569i 2.6390 − 0.7071i −3.0179 + 4.5708i −1.4142 + 1.4142i −2.6390 + 1.7424i 0.1895 − 0.7071i |

TABLE 4-continued

| S. No | DFT output |
|---|---|
| 8 | 0.0000 + 0.0000i 1.4142 + 0.3789i 1.4142 + 1.4142i −2.8284 − 2.8284i 2.4495 + 2.4495i 1.4142 + 5.2779i −2.8284 − 2.8284i −5.2779 + 1.4142i −2.4495 − 2.4495i −2.8284 + 2.8284i 1.4142 + 1.4142i −0.3789 + 1.4142i |
| 9 | 0.0000 + 0.0000i −0.3789 − 1.4142i −1.4142 + 1.4142i −2.8284 − 2.8284i 2.4495 − 2.4495i −5.2779 − 1.4142i 2.8284 − 2.8284i 1.4142 − 5.2779i −2.4495 + 2.4495i −2.8284 + 2.8284i −1.4142 + 1.4142i 1.4142 − 0.3789i |
| 10 | 0.0000 + 0.0000i −1.4142 − 0.3789i 0.5176 − 1.9319i 2.8284 + 2.8284i −3.3461 + 0.8966i −1.4142 − 5.2779i −2.8284 − 2.8284i −3.8637 − 3.8637i −0.8966 + 3.3461i 2.8284 − 2.8284i −1.9319 + 0.5176i 1.0353 + 1.0353i |
| 11 | 0.0000 + 0.0000i −0.1895 − 0.7071i −1.7424 + 2.6390i −1.4142 + 1.4142i 4.5708 − 3.0179i −2.6390 − 0.7071i −5.6569 − 2.8284i −2.6390 +0.7071i −0.3282 − 5.4674i −1.4142 + 1.4142i 3.1566 + 0.1895i −0.1895 + 0.7071i |
| 12 | 0.0000 + 0.0000i −1.4142 − 0.3789i 1.4142 − 1.4142i 2.8284 + 2.8284i −2.4495 + 2.4495i −1.4142 − 5.2779i −2.8284 + 2.8284i 5.2779 − 1.4142i 2.4495 − 2.4495i 2.8284 − 2.8284i 1.4142 − 1.4142i 0.3789 − 1.4142i |
| 13 | −0.0000 + 0.0000i 1.0353 − 1.0353i 1.9319 − 0.5176i −2.8284 − 2.8284i −0.8966 + 3.3461i −3.8637 + 3.8637i 2.8284 + 2.8284i −5.2779 + 1.4142i −3.3461 + 0.8966i 2.8284 − 2.8284i −0.5176 + 1.9319i −0.3789 + 1.4142i |
| 14 | −0.0000 + 0.0000i 1.0353 − 1.0353i −0.5176 − 1.9319i −2.8284 − 2.8284i −3.3461 − 0.8966i −3.8637 + 3.8637i 2.8284 − 2.8284i −5.2779 + 1.4142i −0.8966 − 3.3461i 2.8284 − 2.8284i 1.9319 + 0.5176i −0.3789 + 1.4142i |
| 15 | 0.0000 + 0.0000i −0.3789 − 1.4142i 1.9319 − 0.5176i −2.8284 − 2.8284i −0.8966 + 3.3461i −5.2779 − 1.4142i 2.8284 + 2.8284i 3.8637 + 3.8637i −3.3461 + 0.8966i −2.8284 + 2.8284i −0.5176 + 1.9319i −1.0353 − 1.0353i |
| 16 | 0.0000 + 0.0000i −0.7071 − 0.1895i 0.1895 − 3.1566i −1.4142 − 1.4142i −5.4674 + 0.3282i −0.7071 − 2.6390i −2.8284 + 5.6569i 0.7071 − 2.6390i −3.0179 − 4.5708i 1.4142 − 1.4142i 2.6390 + 1.7424i 0.7071 − 0.1895i |
| 17 | 0.0000 + 0.0000i 0.7071 + 0.1895i 0.1895 − 3.1566i 1.4142 + 1.4142i −5.4674 + 0.3282i 0.7071 + 2.6390i −2.8284 + 5.6569i −0.7071 + 2.6390i −3.0179 − 4.5708i −1.4142 + 1.4142i 2.6390 + 1.7424i −0.7071 + 0.1895i |
| 18 | 0.0000 + 0.0000i −0.1895 − 0.7071i 3.1566 − 0.1895i −1.4142 − 1.4142i −0.3282 + 5.4674i −2.6390 − 0.7071i −5.6569 + 2.8284i −2.6390 + 0.7071i 4.5708 + 3.0179i −1.4142 + 1.4142i −1.7424 − 2.6390i −0.1895 + 0.7071i |
| 19 | 0.0000 + 0.0000i 1.0353 − 1.0353i −1.9319 + 0.5176i −2.8284 − 2.8284i 0.8966 − 3.3461i −3.8637 + 3.8637i −2.8284 − 2.8284i −5.2779 + 1.4142i 3.3461 − 0.8966i 2.8284 − 2.8284i 0.5176 − 1.9319i −0.3789 + 1.4142i |
| 20 | 0.0000 − 0.0000i −0.3789 − 1.4142i −1.9319 + 0.5176i −2.8284 − 2.8284i 0.8966 − 3.3461i −5.2779 − 1.4142i −2.8284 − 2.8284i 3.8637 + 3.8637i 3.3461 − 0.8966i −2.8284 + 2.8284i 0.5176 − 1.9319i −1.0353 − 1.0353i |
| 21 | 0.0000 + 0.0000i 1.4142 + 0.3789i −1.4142 + 1.4142i −2.8284 − 2.8284i 2.4495 − 2.4495i 1.4142 + 5.2779i 2.8284 − 2.8284i −5.2779 + 1.4142i −2.4495 + 2.4495i −2.8284 + 2.8284i −1.4142 + 1.4142i −0.3789 + 1.4142i |
| 22 | 0.0000 + 0.0000i 0.1895 + 0.7071i 3.1566 − 0.1895i 1.4142 + 1.4142i −0.3282 + 5.4674i 2.6390 + 0.7071i −5.6569 + 2.8284i 2.6390 − 0.7071i 4.5708 + 3.0179i 1.4142 − 1.4142i −1.7424 − 2.6390i 0.1895 − 0.7071i |
| 23 | −0.0000 + 0.0000i −1.0353 + 1.0353i −0.5176 − 1.9319i 2.8284 + 2.8284i −3.3461 − 0.8966i 3.8637 − 3.8637i 2.8284 − 2.8284i 5.2779 − 1.4142i −0.8966 − 3.3461i −2.8284 + 2.8284i 1.9319 + 0.5176i 0.3789 − 1.4142i |
| 24 | 0.0000 + 0.0000i −1.4142 − 0.3789i −1.4142 + 1.4142i 2.8284 + 2.8284i 2.4495 − 2.4495i −1.4142 − 5.2779i 2.8284 − 2.8284i 5.2779 − 1.4142i −2.4495 + 2.4495i 2.8284 − 2.8284i −1.4142 + 1.4142i 0.3789 − 1.4142i |
| 25 | 0.0000 + 0.0000i 1.0353 − 1.0353i 0.5176 − 1.9319i −2.8284 − 2.8284i −3.3461 + 0.8966i −3.8637 + 3.8637i −2.8284 − 2.8284i 1.4142 − 5.2779i −0.8966 + 3.3461i 2.8284 − 2.8284i −1.9319 + 0.5176i 1.4142 − 0.3789i |
| 26 | 0.0000 + 0.0000i 1.4142 + 0.3789i −1.9319 − 0.5176i −2.8284 − 2.8284i −0.8966 − 3.3461i 1.4142 + 5.2779i −2.8284 − 2.8284i 3.8637 + 3.8637i −3.3461 − 0.8966i −2.8284 + 2.8284i 0.5176 + 1.9319i −1.0353 − 1.0353i |
| 27 | 0.0000 + 0.0000i 0.7071 + 0.1895i −1.7424 − 2.6390i −1.4142 − 1.4142i −4.5708 − 3.0179i 0.7071 + 2.6390i −5.6569 + 2.8284i 0.7071 − 2.6390i 0.3282 − 5.4674i −1.4142 + 1.4142i 3.1566 − 0.1895i 0.7071 − 0.1895i |
| 28 | 0.0000 + 0.0000i −0.3789 − 1.4142i −1.4142 + 1.4142i −2.8284 − 2.8284i −2.4495 − 2.4495i −5.2779 − 1.4142i 2.8284 + 2.8284i 1.4142 − 5.2779i 2.4495 + 2.4495i −2.8284 + 2.8284i −1.4142 + 1.4142i 1.4142 − 0.3789i |
| 29 | 0.0000 + 0.0000i 1.0353 − 1.0353i −1.9319 − 0.5176i −2.8284 − 2.8284i −0.8966 − 3.3461i −3.8637 + 3.8637i −2.8284 + 2.8284i 1.4142 − 5.2779i −3.3461 − 0.8966i 2.8284 − 2.8284i 0.5176 + 1.9319i 1.4142 − 0.3789i |
| 30 | 0.0000 + 0.0000i −0.5176 + 0.5176i −1.4142 − 2.8284i −1.4142 − 1.4142i −4.8990 − 2.4495i 1.9319 − 1.9319i −5.6569 − 2.8284i 1.9319 + 1.9319i 4.8990 + 2.4495i −1.4142 + 1.4142i −1.4142 − 2.8284i −0.5176 + 0.5176i |

The IDFT module 262 is configured to perform inverse DFT or IFFT of the cyclic shifted frequency domain sequence to generate IDFT data. Thereafter, the output module 264 performs one of CP addition and at least one of windowing, WOLA and filtering operations to generate an output sequence 268.

Figure 3:
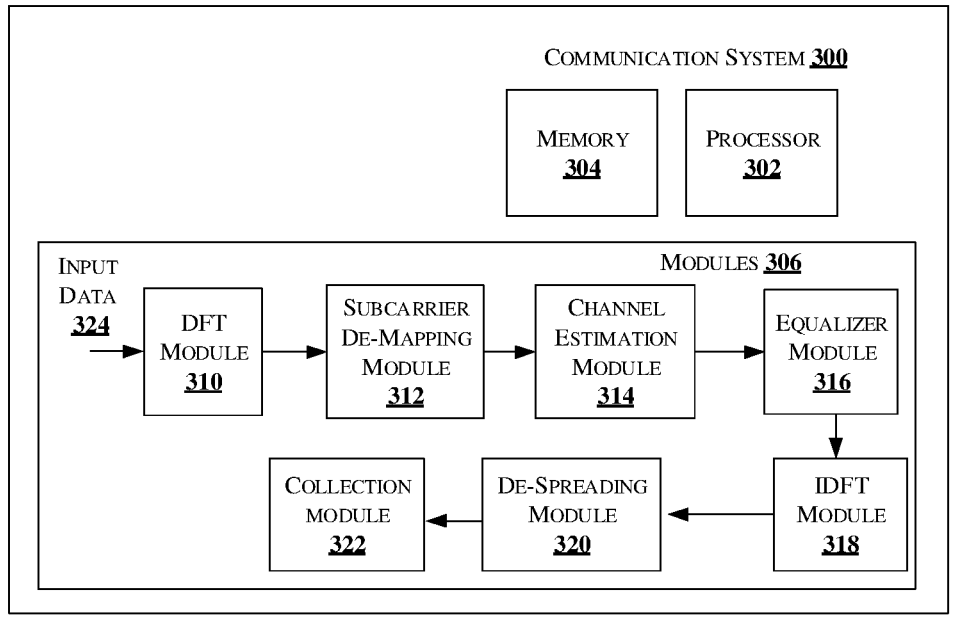
FIG. 3 shows a block diagram illustration of a communication system for receiving waveform, in accordance with an embodiment of the present disclosure.

FIG. 3 shows a block diagram illustration of a communication system 300 for receiving waveform, in accordance with an embodiment of the present disclosure.

As shown in FIG. 3, the communication system 300 includes a processor 302, and memory 304. The communication system 300 is also referred as a receiver. The memory 304 may be communicatively coupled to the processor 302. The processor 302 may be configured to perform one or more functions of the receiver 300 for receiving data. In one implementation, the receiver 300 may comprise modules 306 for performing various operations in accordance with the embodiments of the present disclosure.

The modules 306 includes a discrete Fourier Transform (DFT) module 310, a subcarrier de-mapping module 312, a channel estimation module 314, an equalizer module 316, an inverse discrete Fourier Transform (IDFT) 318, a De-spreading/Demodulation module 320 and a collection module 322.

The DFT module 310 is also referred as fast Fourier Transform (FFT) module. The DFT module 310 is configured to perform a DFT/FFT operation of the input data 324 to generate transformed data.

The subcarrier de-mapping module 312 performs the de-mapping operation on the transformed data, to collect allocated subcarriers. The channel estimation module 314 performs estimation of channel through which the receiver 300 receives the input data 324. After performing the channel estimation, the equalizer module 316 performs equalization of constellation de-rotated data. In another embodiment, when the transmitter uses pi/2 BPSK sequences, the equalizer module 316 is a widely linear equalizer module for filtering the de-mapped transformed output data is performed using a widely linear equalizer to generate filtered data by removing effects associated with physical channel and the precoder in the communication network.

The IDFT module 318 performs inverse Fourier transformation of equalized data and then followed by demodulation or soft demodulation on the transformed data using the De-spreading module 320 to generate de-spread data. Thereafter, the collection module 322 collects the data de-spread data, thereby identifying the received input data.

Figure 4A:
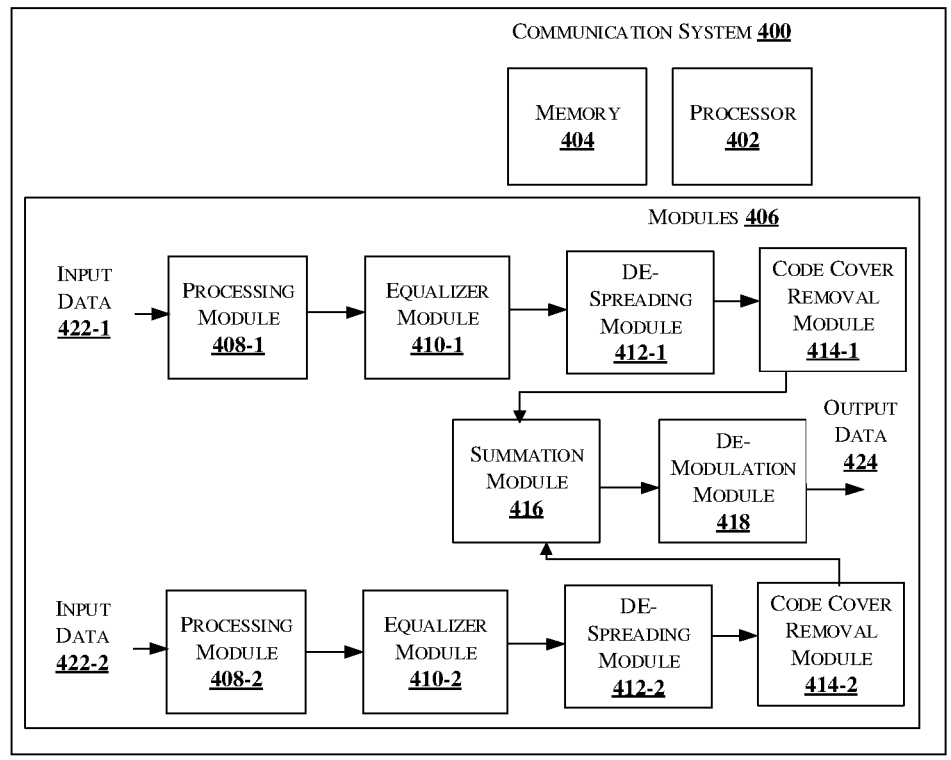
FIG. 4A shows a block diagram of a communication system for receiving the waveform, in accordance with an embodiment of the present disclosure.

FIG. 4A shows a block diagram illustration of a communication system, in accordance with an embodiment of the present disclosure.

As shown in FIG. 4A, the communication system 400 includes a processor 402, and memory 404. The communication system 400 is also referred as a receiver. The memory 404 may be communicatively coupled to the processor 402. The processor 402 may be configured to perform one or more functions of the receiver 400 for receiving data. In one implementation, the receiver 400 may comprise modules 406 for performing various operations in accordance with the embodiments of the present disclosure.

The modules 406 includes processing modules 408-1, 408-2, equalizer modules 410-1, 410-2, De-spreading modules 412-1, 412-2, code cover removal modules 414-1, 414-2, summation module 416 and de modulation modules 418.

Each processing module 408-1, 408-2 comprises a discrete Fourier transform (DFT) module, also referred as a fast Fourier Transform (FFT) modules, subcarrier de-mapping module, and channel estimation module. The DFT module is configured to perform a DFT/FFT operation of the input data 422-1, 422-2. The subcarrier de-mapping module performs the de-mapping operation on the transformed data, to collect allocated subcarriers. The channel estimation module performs estimation of a channel through which the receiver 400 receives the data.

After performing the channel estimation, the equalizer modules 410-1, 410-2 performs equalization, to generate equalized data. The de-spreading modules 412-1, 412-2 performs respective de-spreading to generate corresponding de-spread data. The code cover removal modules 414-1, 414-2 removes the code cover from the de-spread data to generate corresponding data without code cover. The summation module 416 combines the de-spread data without code cover to generate combined data. The demodulation module 418 identifies the input data by demodulating the combined data to generate an output sequence.

In an embodiment for short PUCCH transmission using 1 or 2 bit UCI and BPSK spreading of BPSK/QPSK UCI constellation points (UCI is mapped to BPSK or QPSK), considering signaling from a base station (BS) i.e. a transmitter, which is any of the communication systems 100, 200 to user equipment (UE), which is a receiver 300, 400. A code, also referred as sequence, allocation is performed across plurality of BSs, also referred as multiple sectors or BSs, to reduce interference. The BSs 100 and 200 may use a combination of code allocation and different frequency resources to the users to reduce interference. Let an input sequence from a BS 100 and 200, be a BPSK sequence which is communicated to a UE 300, 400 through two indices, first index and second index. The first index may indicate cell/BS specific index and second index is a shift. In an embodiment, there may be N base sequences and L shifts. Upon allocation of a base sequence by the BS 100, and 200 to the UE 300, 400, that is determined by an index, wherein the index values may be 1, 2, ..., N, the BPSK code cover may be obtained by shifting the base sequence circularly with a shift that is indicated to the UE. The shift may take one of L values.

One embodiment of the present disclosure is user multiplexing i.e. 1 or 2-bit control information may be transmitted over multiple OFDM symbols while code multiplexing multiple user using the communication system 100, 200. Let C (i, j) denote a length M code where M is the occupies number of subcarriers, for example M=12. The index i is the first index (base sequence index) that takes values 1, 2, ..., N and index j is the second index that indicates a shift applied to base sequence that takes values in the range j=1, 2, ..., L. In an embodiment, the communication 100, 200 is a base station (BS), which may multiplex users in the same time frequency resources i.e. M subcarriers of an OFDM symbols by assigning different values of i and j among users. The values of i and j may be chosen such that allocated sequences are orthogonal between multiplex users. The BS may assign same value of first index to all multiplexed users but different values of j (shifts) in one OFDM symbols. For example, the maximum number of multiplexed users is 6.

In one embodiment, the BS 100, 200 may use a code cover across multiple OFDM symbols to increase multiplexing capacity. For example, first and second indices, having same value, may be assigned to a group of multiplexed users. However, user's data may be separated at the receiver by using an orthogonal code cover that is a sequence where elements of the sequence are multiplexed with a control signal occupied in the OFDM symbols, where users are time multiplexed. The orthogonal code cover may be Walsh Hadamard sequence or DFT sequence. Similarly, if multiple users are multiplexed on the same time frequency resource, the RS occupied by the users over multiple OFDM symbols are designed to be orthogonal sequences across multiplexed users. Orthogonality may be achieved by a sequence within OFDM symbols or across OFDM symbols. For example, in case of ZC sequences, different shifts may be used across RS of OFDM symbols. If same shift is used across multiple OFDM symbols, then an orthogonal code cover is used to separate multiple users who are multiplexed on the same resources.

In an embodiment, a combination of the first shift, second shift (cyclic shift) and orthogonal code cover may be used for the control information that is spread across multiple OFDM symbols to reduce interference caused by co-channel control transmissions that occur in other cells/BSs. A scheduler (not shown in Fig.) configured in the BS may coordinate through allocation of appropriate indices and code covers.

Figure 4B:
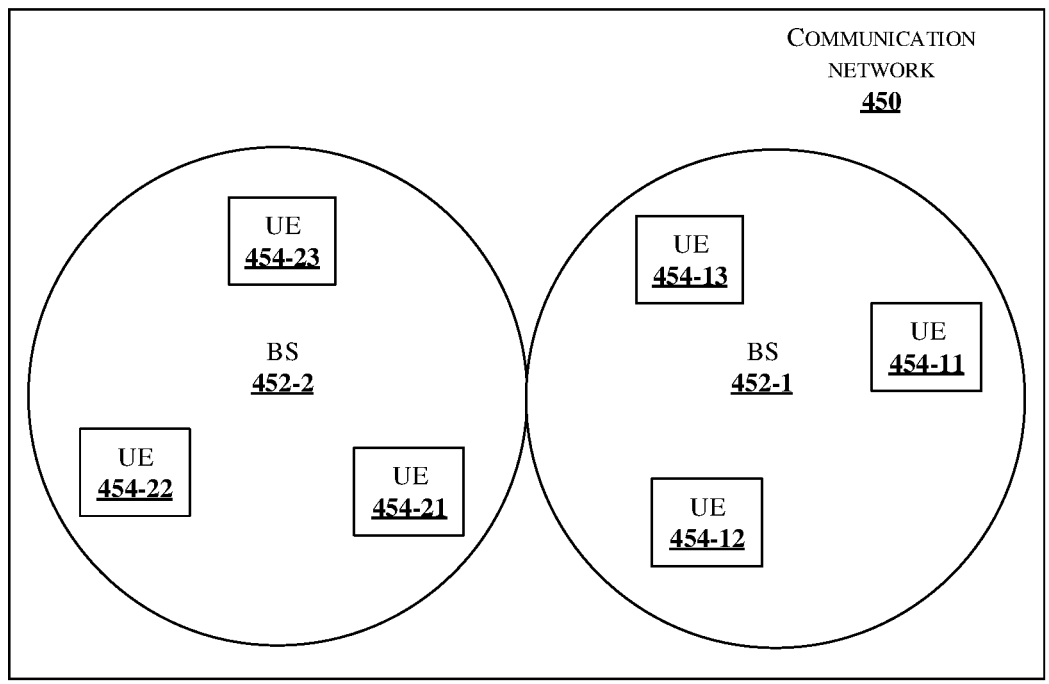
FIG. 4B illustrates an example scenario of BSs that multiplex user equipment's, in accordance with an embodiment of the present disclosure.

In an embodiment, considering user multiplexing capacity is less than 6, a BS may multiplex less than 6 users on the same resource. In such a scenario, the available second indices (shifts) may be used in other cells/BSs. More specifically, two or three adjacent sectors may use the same first index (base sequence) and distinct second indices (shifts) so that control transmissions across three sectors are orthogonal in three sectors. This may be achieved by assigning same first index of base sequence to all three sectors and further allocate shifts (1,2) in first sector, shifts (3,4) in second sector and shifts (5,6) in another sector where each sector multiplexes two users in the same OFDM symbols. FIG. 4B illustrates an example scenario of BSs that multiplex user equipment's, in accordance with an embodiment of the present disclosure.

As shown in FIG. 4B, in a communication network 450, considering a first BS 452-1 and a second BS 452-2 each with three sectors. A scheduler may allocate different first indices or different base sequences, to the first BS 452-1 and the second BS 452-2 so that sequences allocated have very low cross correlation i.e. including zero cross correlation between codes allocates users of first BS 452-1 and second BS 452-2.

In an embodiment, the above base sequences may be used as RS without multiplying with BPSK or QPSK control information. Alternatively, ZC sequences may be used for RS. In an embodiment, a pool of base sequences shown in Set 2 may be used.

In another embodiment, neighbouring sectors may allocate same base sequence and allocate a reduced number of shifts for user multiplexing. For example, if each sector multiplexes a maximum of two users in one OFDM symbol, then each sector may use 2 out of 6 shifts of a base sequence such that three sectors have six users using 6 different shifts resulting interference free communications between the six users located in a BS (3-sectors). This embodiment may be extended to other BS using remaining base sequences.

In an embodiment, multiplexing capacity in a sector may be increased more than 6 per base sequence by repeating the control information in multiple OFDM symbols and using OFDM symbol specific code cover or further spreading code over OFDM symbols. Similarly, multiplexing may be used for RS design to increase user multiplexing.

In an embodiment where the user communication control or data using a spreading sequence, the BS does not signal or indicate the spreading sequence to the user, the user may choose one of the available set of spreading sequences specified by the base sequences and/or the cyclic shift. The user may randomly choose either the base sequence or a shift or both. The base station receiver would have to decode all possible spreading sequences characterized by the base sequences and/or cyclic shifts in order to determine the set of spreading sequences used, and also the information carried by the users.

Figure 5:
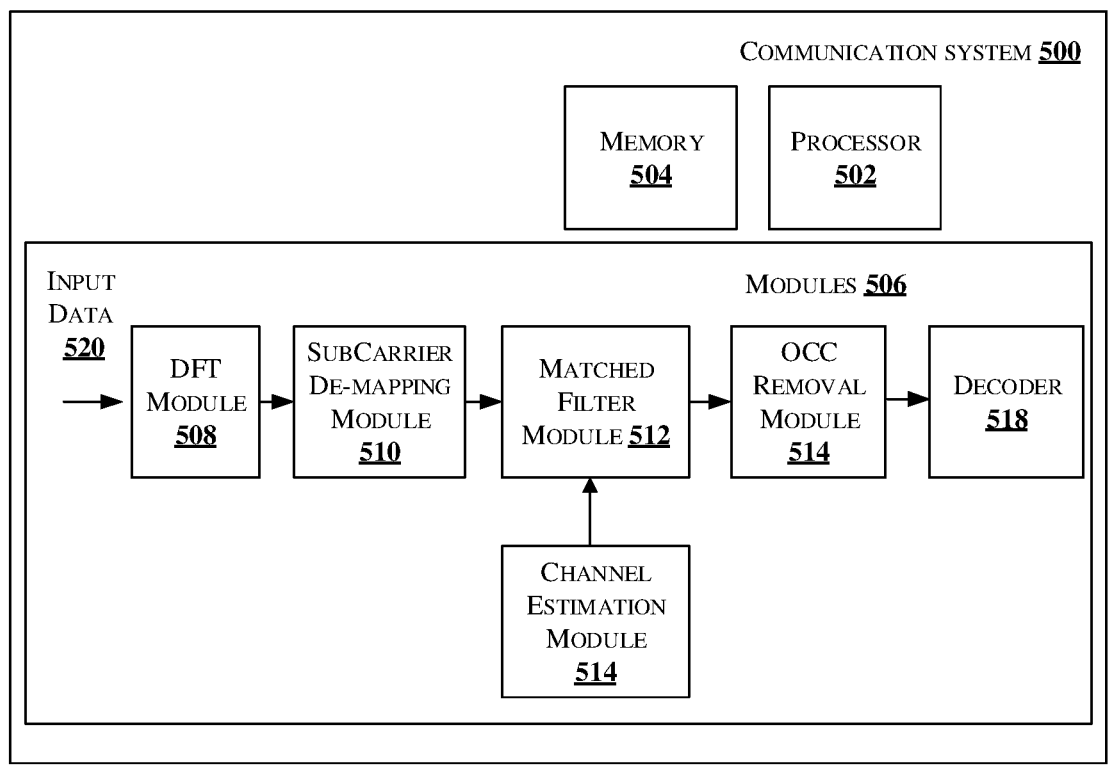
FIG. 5 shows a block diagram of a communication system for receiving the waveform in frequency domain, in accordance an embodiment of the present disclosure.

FIG. 5 shows a block diagram of a communication system for receiving the waveform in frequency domain, in accordance an embodiment of the present disclosure.

As shown in FIG. 5, a communication system 500 includes a processor 502, and memory 504. The communication system 500 is also referred as a receiver. The memory 504 may be communicatively coupled to the processor 502. The processor 502 may be configured to perform one or more functions of the receiver 500 for receiving data. In one implementation, the receiver 500 may comprise modules 506 for performing various operations in accordance with the embodiments of the present disclosure.

The modules 506 includes a discrete Fourier Transform (DFT) module 508, subcarrier de-mapping module 510, matched filter 512, a channel estimation module 514, orthogonal code cover (OCC) removal module 516, and a decoder module 518. The DFT module is also referred as a fast Fourier Transform (FFT) module.

In one embodiment, the DFT module 508 receives the input data 520, and performs DFT/FFT operation of the input data 520. The subcarrier de-mapping module 510 receives the output data from the DFT module 508 and performs sub-carrier de-mapping to generate the de-mapped output i.e., frequency domain sequence which is matched filtered by the matched filter 512 using the estimated channel and the frequency domain sequence. The estimated channel is provided by the channel estimation module 514. The matched filter 512 performs multiplication with the complex conjugate of the estimated channel and frequency domain sequence at each subcarrier.

In the presence of multiple receiver antennas, the matched filter 512 is first applied with estimated channels of each receiver antenna and outputs of these multi-antenna antenna matched filters are combined to obtain channel matched filter output followed by another matched filtering with frequency domain sequence. Thereafter, the resulting output is summed over all available subcarriers to obtain an OFDM symbol level output. The OCC removal module 516 removes the OCC by multiplying this OFDM symbol level output with complex conjugate of the OCC used for that OFDM symbol, then sum over multiple OFDM symbols with OCC to obtain a decision variable. The decoder 518 is configured to decode the decision variable using one of BPSK and QPSK demodulator to identify the input data 520. This type of receiver is useful for the case where user communicated 1 or 2 bit UCI using BPSK or QPSK modulation alphabet.

Figure 6A:
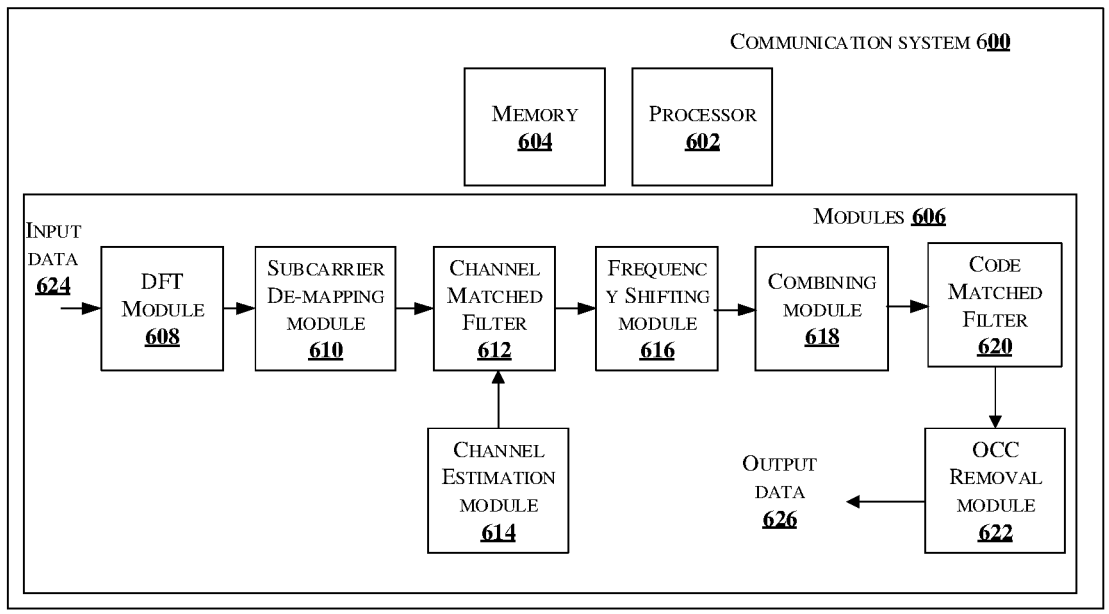
FIG. 6a shows a block diagram of a communication system for receiving the waveform with widely linear code cover, in accordance with another embodiment of the present disclosure.

FIG. 6 shows a block diagram of a communication system for receiving the waveform with widely linear receiver, in accordance with another embodiment of the present disclosure.

As shown in FIG. 6, a communication system 600 includes a processor 602, and memory 604. The communication system 600 is also referred as a receiver. The memory 604 may be communicatively coupled to the processor 602. The processor 602 may be configured to perform one or more functions of the receiver 600 for receiving data. In one implementation, the receiver 600 may comprise modules 606 for performing various operations in accordance with the embodiments of the present disclosure.

The modules 606 includes a discrete Fourier Transform (DFT) module 608, subcarrier de-mapping module 610, matched filter 612, a channel estimation module 614, frequency shifting module 616, combining module 618, code matched filter 620, and orthogonal code cover (OCC) removal module 622. The DFT module 608 is also referred as a fast Fourier Transform (FFT) module.

In one embodiment, the DFT module 608 receives the input data 624, and performs DFT/FFT operation of the input data 624. The subcarrier de-mapping module 610 receives the output data from the DFT module 608 and performs sub-carrier de-mapping to generate a de-mapped data. The channel matched filter 612 performs multiplication of de-mapped data with the complex conjugate of the estimated channel at each subcarrier. In the presence of multiple receiver antennas, the matched filter is first applied with estimated channels of each receiver antenna and outputs of these multi-antenna matched filters are combined to obtain channel matched filter output.

The frequency shifting module 616 performs circular shift on each of the output of channel matched filter to remove pi/2 constellation by a value M/4 on. The combining module 618 is configured to sum the frequency-shifted output and corresponding complex-conjugated, and frequency revered of the frequency shifted output to obtain a summed output. Thereafter, the code matched filter 620 multiplying each subcarrier of summed output with a DFT of the BPSK input sequence, and perform summation over all available subcarriers, to obtain an OFDM symbol level output. The OCC removal module 622 removes the OCC by multiplying the OFDM symbol level output with complex conjugate of OCC used for that OFDM symbol, then sum over multiple OFDM symbols with OCC to obtain a decision variable. A demodulator (not shown in FIG. 6) demodulates the decision variable using BPSK or QPSK demodulator to obtain an output data 626, which is the received input data 624.

Figure 6B:
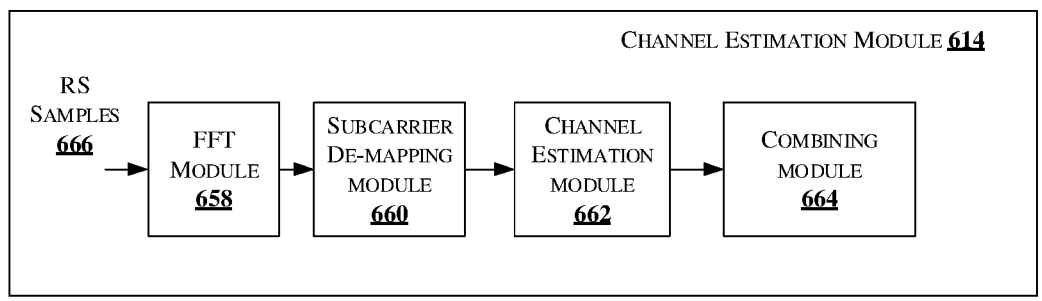
FIG. 6b shows a block diagram of a channel estimation module in accordance with some embodiment of the present disclosure.

FIG. 6b shows a block diagram of a channel estimation module in accordance with some embodiment of the present disclosure.

As illustrated, the channel estimation module 614 comprises one or more blocks including an FFT module 658, a sub-carrier de-mapping module 660, a channel state information estimation module (CSI estimation module) 662 and a combining module 664. In one embodiment, RS samples 666 are collected as input to the channel estimation module 614 from multiple OFDM symbols carrying RS. The FFT module 658 performs FFT operation on each RS OFDM symbol sample to generate RS OFDM FFT sample. The sub-carrier de-mapping module 660 collect RS sub-carrier through sub-carrier de-mapping operation. The CSI estimation module 662 determines RS channel state information using knowledge of RS and OCC for that symbol. In one aspect, the OCC may be received from BS. The combining module 664 combines or interpolates the RS channel state information of multiple RS OFDM symbols to generate the channel state information of the RS samples and provide the generated channel state information to the filter modules for further processing.

Figure 7:
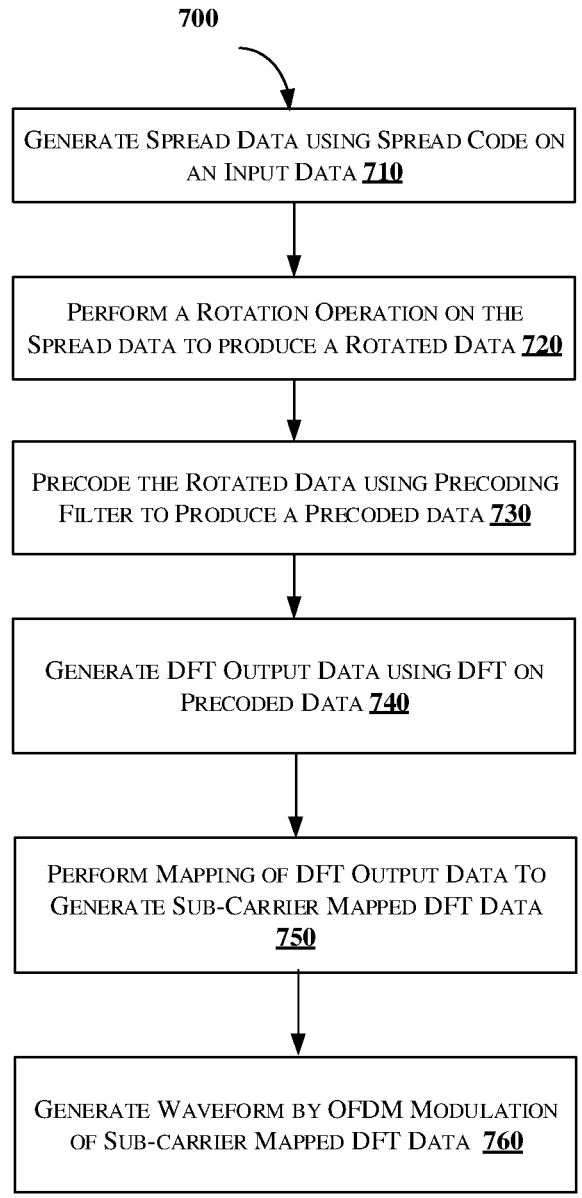
FIG. 7 shows a flowchart illustrating a method of generating waveform by a communication system, in accordance with some embodiments of the present disclosure.

FIG. 7 shows a flowchart illustrating a method of generating waveform by a communication system, in accordance with some embodiments of the present disclosure.

As illustrated in FIG. 7, the method 700 comprises one or more blocks for generating waveform by a communication system. The method 700 may be described in the general context of computer executable instructions. Generally, computer executable instructions can include routines, programs, objects, components, data structures, procedures, modules, and functions, which perform functions or implement abstract data types.

The order in which the method 700 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 710, an input data is processed by spreading operation using a spread code to generate spread data. In one embodiment, the spreading module 108 receives an input data 118 which may be BPSK symbols that are spread using a spreading code to generate spread data. For example, the input data 118 may be a BPSK sequence. In another example, the input BPSK sequence may be of length Q=1 for 1-bit feedback. In another embodiment, the spreading module 108 may receive input as two bits, which may be communicated using a QPSK constellation point and further spread using a BPSK spreading code.

At block 720, a rotation operation on the multiplied data is performed to produce a rotated data. In one embodiment, the rotation module 110 receives the spread data and performs a constellation rotation operation on the received spread data. The rotation module 108 performs $j^k$ rotation on the spread data 118 i.e., on the BPSK spread sequence to generate a rotated sequence. The rotated sequence is fed to the precoder 112 for pre-coding the rotated inputs sequence.

At block 730, the rotated data is precoded using a pre-coding filter to produce a precoded data. In one embodiment, the precoding filter is one of 1+D precoder and 1−D precoder. In an embodiment, considering time domain, the precoder 112 represents a circular convolution of input with a two-tap filter, where the two taps have equal values. The precoder 112 reduces PAPR of the output waveform significantly. The precoder 112 output is a pre-coded data, which is fed to the DFT module 114.

At block 740, DFT operation is performed on the pre-coded data to generate DFT output data. At block 750, mapping of DFT output data is performed to generate sub-carrier mapped DFT data. In one embodiment, the DFT module 114 performs a DFT spreading and subcarrier mapping on the precoded data, and the output of the DFT module 114 is mapped with contiguous or distributed subcarriers for generating the transformed sequence. In an embodiment, considering the precoder 112 is a 1+D precoder, then the DFT module 114 performs a subcarrier mapping such that the DFT is taken over the range 0, . . . , M−1, then the left half of DFT output will be swapped with right half. In another embodiment, if the precoder 112 is a 1−D precoder and if the DFT is taken over the range 0, . . . , M−1, then the output of the DFT module 114 output will be directly mapped to one of contiguous and distributed subcarriers.

In another embodiment, the precoder may be a filter with real or complex-values whose length is less than or equal to the DFT size. In yet another embodiment, the precoder may be alternatively implemented in frequency domain after the DFT as a subcarrier level filter. The said subcarrier filter may be computed as the M-point DFT of the time domain precoder.

At block 760, waveform with low PAPR is generated. In one embodiment, the IDFT module 116 is configured to perform an inverse transform of the transformed sequence, to generate a time domain signal. After the IDFT or IFFT operation, the output module 118 performs at least one of addition of cyclic prefix, cyclic suffix, windowing, windowing with overlap and adding operation (WOLA) on the time domain signal to generate output sequence 122. A half subcarrier frequency shift may be applied to avoid DC transmission. In an embodiment, the output sequence 122 may be fed to the digital to analog converter to generate an analog waveform. The output sequence 122 is at least one of 1-bit control data and 2-bit control data for short duration physical uplink control channel (PUCCH), in an embodiment. In one embodiment of 1 or 2 bit UCI, the waveform may be realized by pre-computing the values at the output of DFT for a given spreading sequence with a reference positive BPSK input so that the entire waveform may be specified as a sequence. This sequence may be multiplied with a BPSK or QPSK UCI symbol before applying subcarrier mapping and IDFT. This method results in a set of frequency domain sequences that are only a function of BPSK spreading sequences. In a preferred embodiment the precoder takes 2 or 3-taps in time domain. In another embodiment, the output sequence 122 is a long PUCCH that transmit UCI of length more than 2 bits.

Figure 8:
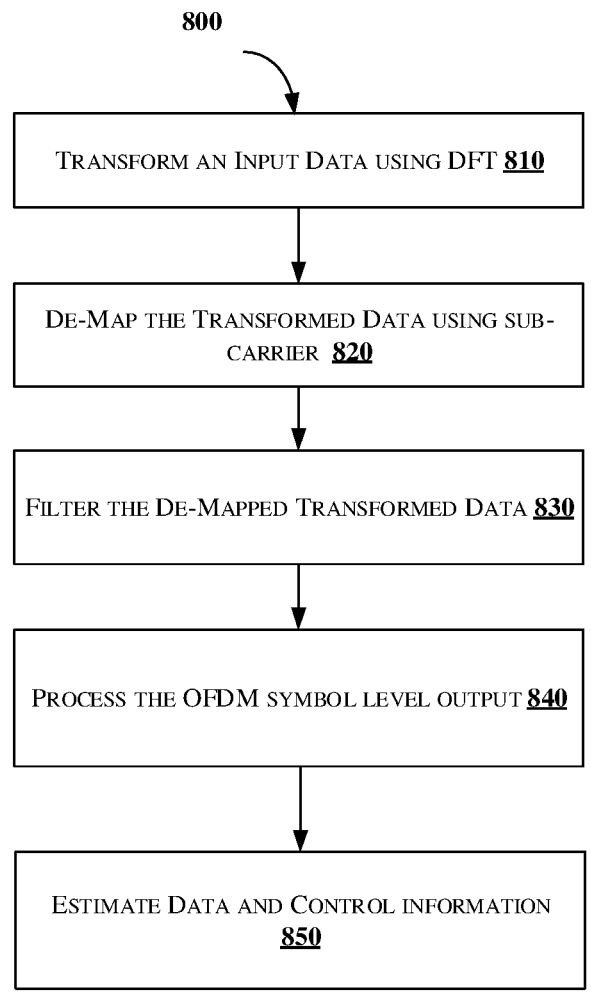
FIG. 8 shows a flowchart illustrating a method for detecting a waveform in a communication network, in accordance with some embodiments of the present disclosure.

FIG. 8 shows a flowchart illustrating a method of detecting waveform by a communication system, in accordance with some embodiments of the present disclosure.

As illustrated in FIG. 8, the method 800 comprises one or more blocks for detecting waveform by a communication system. The method 800 may be described in the general context of computer executable instructions. Generally, computer executable instructions can include routines, programs, objects, components, data structures, procedures, modules, and functions, which perform functions or implement abstract data types.

The order in which the method 800 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 810, an input data is transformed using DFT. In one embodiment, the DFT module 508 receives the input data 520, and performs DFT/FFT operation of the input data 520.

At block 820, the transformed input data is de-mapped using sub-carrier. The subcarrier de-mapping module 510 receives the output data from the DFT module 508 and performs sub-carrier de-mapping to generate the de-mapped output i.e., frequency domain sequence.

At block 830, the de-mapped transformed data is filtered. In one embodiment, the frequency domain sequence is matched filtered by the matched filter 512 using the estimated channel and the frequency domain sequence. The estimated channel is provided by the channel estimation module 514. The matched filter 512 performs multiplication with the complex conjugate of the estimated channel and frequency domain sequence at each subcarrier. In the presence of multiple receiver antennas, the matched filter 512 is first applied with estimated channels of each receiver antenna.

At block 840, the OFDM symbol level output is processed. In one embodiment, the outputs of these multi-antenna antenna matched filters are combined to obtain channel matched filter output followed by another matched filtering with frequency domain sequence. Thereafter, the resulting output is summed over all available subcarriers to obtain an OFDM symbol level output. The OCC removal module 516 removes the OCC by multiplying this OFDM symbol level output with complex conjugate of the OCC used for that OFDM symbol, then sum over multiple OFDM symbols with OCC to obtain a decision variable.

At block 850, data and control information are estimated. The decoder 518 is configured to decode the decision variable using one of BPSK and QPSK demodulator to identify the input data 520.

Finally, the language used in the specification has been principally selected for readability and instructional purposes, and it may not have been selected to delineate or circumscribe the inventive subject matter. It is therefore intended that the scope of the invention be limited not by this detailed description. Accordingly, the disclosure of the embodiments of the invention is intended to be illustrative, but not limiting, of the scope of the invention.

While various aspects and embodiments have been disclosed herein, other aspects and embodiments will be apparent to those skilled in the art. The various aspects and embodiments disclosed herein are for purposes of illustration and are not intended to be limiting.

I claim:

1. A method for generating a waveform in a communication network, the method comprising:
   performing spreading operation, by at least one transmitter, on an input data with a spread code to generate a spread data;
   rotating, by the at least one transmitter, the spread data to produce a rotated data;
   precoding, by the at least one transmitter, the rotated data using a precoding filter to produce a precoded data;
   transforming, by the at least one transmitter, the precoded data using Discrete Fourier Transform (DFT) to generate DFT output data;
   mapping, by the at least one transmitter, the DFT output data with subcarriers to generate a sub-carrier mapped DFT data; and
   generating, by the at least one transmitter, a waveform by performing Orthogonal Frequency Division Multiplexing (OFDM) modulation of the sub-carrier mapped DFT data, wherein the spread data is indicated by a first index and a second index, and wherein the first index indicates transmitter specific index and the second index indicates number of shifts; and
   circular shifting of the spread data which is indicated by the first index, wherein a number of times the circular shifting operating is performed is indicated by the second index.

2. The method as claimed in claim 1, wherein the input data is at least one of data, control information and reference symbol.

3. The method as claimed in claim 1, further comprising the step of optionally multiplying the subcarrier mapped DFT data with an element of Orthogonal Cover Code (OCC).

4. The method as claimed in claim 1, further comprising performing Inverse Discrete Fourier Transform (IDFT) on the subcarrier mapped DFT with OCC to generate IDFT output.

5. The method as claimed in claim 1, wherein the spreading code is one of Binary Phase Shift Keying (BPSK) spreading sequence, Zadoff-Chu (ZC) sequence and Quadrature Phase Shift Keying (QPSK) sequence.

6. The method as claimed in claim 5, wherein the spread data is rotated using a 90-degree for the BPSK spread sequence.

7. The method as claimed in claim 1, wherein the rotated data is precoded using one of 1+D and 1−D precoder to obtain the precoded data, wherein D is the delay unit.

8. The method as claimed in claim 1, wherein the rotated data is precoded using a 3-tap filter $0.26\ D^{-1}+0.92+0.26\ D$ or $-0.26\ D^{-1}+0.92-0.26\ D$.

9. The method as claimed in claim 1, wherein the spread data is BPSK sequence indicated by at least one index.

10. The method as claimed in claim 1, wherein the input data is repeated over multiple OFDM symbols with one of same code cover and different code covers.

11. The method as claimed in claim 1, wherein the spread data is predetermined so that all shifted sequences of the spread data are orthogonal to each other.

12. The method as claimed in claim 1, wherein the spread data is indicated by the first index having a same value and the second index by a plurality of values in one OFDM symbols.

13. The method as claimed in claim 1, wherein at least two transmitters are having one of different first indices and same first index with different second index.

14. The method as claimed in claim 1, wherein the method comprising steps of:
receiving an input frequency domain sequence;
processing the received input frequency domain sequence using a predetermined complex exponential value to generate cyclic shifted frequency domain sequence; and
performing inverse IDFT operation on the cyclic shifted frequency domain sequence to obtain IDFT data.

15. A method for detecting a waveform in a communication network, the method comprising:
transforming, by a receiver, an input data received from a transmitter using Discrete Fourier Transform (DFT) to obtain transformed data;
de-mapping, by the receiver, the transformed data using sub carriers to generate a demapped transformed output data;
filtering, by the receiver, the de-mapped transformed output data using estimated channel information to generate an OFDM symbol level output;
processing, by the receiver, the OFDM symbol level output to remove a cover code and generate processed OFDM symbol data, wherein processing the OFDM symbol level output comprises removing of the orthogonal cover code (OCC) by multiplying the OFDM symbol level output with complex conjugate of the OCC used for the OFDM symbol;
estimating, by the receiver, at least one of data and control information by demodulating the processed OFDM symbol data;
summing over plurality of OFDM symbols with the OCC to obtain a decision variable; and
determining one of BPSK and QPSK demodulation from the decision variable for estimating the user data and control information.

16. The method as claimed in claim 15, wherein a length of the input data is equal to one of greater than one and one.

17. The method as claimed in claim 15, wherein filtering the de-mapped transformed output data is performed using a widely linear equalizer to generate filtered data by removing effects associated with physical channel in the communication network.

18. The method as claimed in claim 15, wherein the filtering the de-mapped transformed output data uses channel estimates obtained from reference symbols for 1 bit and 2-bit control information detection to generate the filtered data.

19. The method as claimed in claim 15, further comprising performing Inverse Discrete Fourier Transform (IDFT) operation on the filtered data to generate IDFT output data and de-spreading the IDFT output data to generate de-spread data removing the effects of spreading and rotation.

20. The method as claimed in claim 15, wherein the filtering is performed by an equalizer to generate the filtered data by removing effects associated with propagation channel.

21. The method as claimed in claim 20, wherein the filtered data is combined over all available subcarriers to obtain the OFDM symbol level output.

* * * * *